United States Patent Office 3,701,679
Patented Oct. 31, 1972

3,701,679
VINYL RESIN AND GRADED ACRYLIC RUBBER-URETHANE-ACRYLATE PAINT AND PAINTING PROCESS
Olin B. Johnson, Livonia, and Santokh S. Labana, Dearborn Heights, Mich., assignors to Ford Motor Company, Dearborn, Mich.
No Drawing. Filed Dec. 21, 1970, Ser. No. 100,540
Int. Cl. C08g 45/04
U.S. Cl. 117—93.31       34 Claims

ABSTRACT OF THE DISCLOSURE

A radiation-curable paint binder dispersion comprises vinyl monomers, an alpha-beta olefinically unsaturated vinyl resin having molecular weight in excess of about 1,000 and, an addition product of a hydroxy-functional graded rubber particle, a diisocyanate and a hydroxyalkyl acrylate. The dispersion is applied to substrates and cured thereon by exposure to ionizing radiation, e.g., an electron beam.

THE INVENTION

A unique, rubber-comprising, radiation-curable paint is provided by preparing a film-forming dispersion of vinyl monomers, an alpha-beta olefinically unsaturated vinyl resin, and the addition product of a hydroxy-functional, graded acrylic rubber particle, a diisocyanate and a hydroxyalkyl acrylate. The dispersion is applied to substrates, e.g., wood, metal, glass, shaped polymeric solid, etc., and cured thereon by ionizing radiation, e.g., an electron beam.

(I) The vinyl resin component

The alpha-beta olefinically unsaturated vinyl resins used herein have average molecular weight in excess of about 1,000, advantageously in the range of about 5,000 to about 25,000, and preferably in the range of about 5,000 to about 15,000.

The vinyl resins employed herein may be prepared by various methods all of which, in at least one preparation step, involve the copolymerization of vinyl monomers. At least a major portion of the constituent monomers are acrylic monomers or a combination of acrylic monomers and vinyl hydrocarbon monomers. A minor proportion of the constituent monomers may be other than vinyl monomers, e.g., allylic compounds.

In a preferred embodiment, the copolymers consist essentially of the polymerization product of acrylic monomers. The term "acrylic monomer" as used herein means acrylic acid, methacrylic acid, monoesters of acrylic acid or methacrylic acid and a $C_1$–$C_8$ monohydric alcohol, e.g., methyl methacrylate, ethyl acrylate, butyl acrylate, hexyl acrylate, 2-ethyl hexyl acrylate, etc., and oxygenated or oxygen substituted derivatives of acrylic or methacrylic acid, e.g., glycidyl methacrylate, hydroxyethyl acrylate, hydroxyethyl methacrylate, hydroxypropyl acrylate, hydroxypropyl methacrylate, etc. The aforementioned oxygenated or oxygen substituted derivatives of acrylic or methacrylic acid, when employed, will comprise about 1 to about 0 mole percent of the vinyl copolymer. Other acrylic monomers which may be employed, as hereinafter illustrated, include acrylyl chloride and methacrylyl chloride.

The vinyl hydrocarbons which may be employed with the acrylic monomers are preferably $C_8$–$C_9$ vinyl hydrocarbons such as styrene, alpha methyl styrene, vinyl toluene, etc.

The vinyl resins employed herein have alpha-beta olefinic unsaturation. The concentration of alpha-beta olefinic unsaturation units per 1,000 units molecular weight is broadly in the range of about 0.5 to 5, preferably in the range of about 0.7 to 3.5, units per 1,000 units molecular weight.

(II) Preparation of the graded rubber particle

The graded rubber particle has a core of crosslinked elastomeric, acrylic polymer, an outer shell comprising methyl methacrylate and a hydroxy-functional acrylate and an intermediate layer which is copolymer of the monomers used to form the core and the monomers used to form the outer shell.

The process for preparing these particular materials is at least a two-stage process. In one method of preparation a major amount of monofunctional monoacrylate is emulsion copolymerized in the first stage with a crosslinking amount of di- or tri-functional monomer containing two or more non-conjugated terminal ethylenic groups, preferably a diacrylate, using a water-soluble free radical initiator and a suitable surfactant to yield a latex of relatively uniform particle size, e.g., 0.04 to 1 micron average diameter. Before this reaction reaches substantial completion, i.e., when the reaction is between about 50 and about 90, preferably between about 70 and about 89, percent complete, the second stage monomeric component, i.e., mixture of about 65 to about 99, preferably about 70 to about 95 mole percent methyl methacrylate, and about 1 to about 35, preferably about 5 to about 30 mole percent of a hydroxyalkyl or a mixture of about 1 to about 35, preferably about 5 to about 30, mole percent hydroxyalkyl acrylate and about 65 to about 99 mole percent of a monomer mixture selected from and consisting essentially of esters of acrylic or methacrylic acid and a $C_1$–$C_8$ monohydric alcohol, monovinyl hydrocarbons, diacrylates and divinyl hydrocarbons, is added slowly to the reaction mixture. The polymerization process is continued to yield a stable latex of relatively uniform particle size and composition. A surfactant is used in forming the emulsion and additional surfactant may be added simultaneously with the second stage monomeric component.

The latex is coagulated, washed and dried to yield a finely divided white powder suitable for use in this invention. Generically, the particles are prepared from monomers that will provide a crosslinked acrylic rubber-like core and a glass-like polymeric outer shell, at room temperature, e.g., 20°–30° C. The terms rubber-like and glass-like are, of course, meaningless except when used in reference to a specific temperature or temperature range. The particles should be formulated so that the core retains its rubber-like properties and the outer shell retains its glass-like properties at temperatures encountered by articles of commerce in the intended field of use. Hence, for practical purposes, the monomer should be selected so that the core has a glass transition temperature that is substantially below that of the outer shell. Advantageously, the difference in glass transition temperature between the core and the shell is at least 50° C., preferably above 100° C.

The core is formed from a major amount of an alkyl, monofunctional, monoacrylate and a crosslinking amount of a di-or tri-functional monomer containing two or more nonconjugated terminal ethylenic groups. The nonfunctional, alkyl monoacrylate is preferably an ester of a $C_2$–$C_8$ monohydric alcohol and acrylic acid, e.g., ethyl acrylate, butyl acrylate, hexyl acrylate, 2-ethyl hexyl acrylate and/or mixtures of the same. Certain other alkyl acrylates may be used when the crosslinked polymer thereof has an appropriate glass transition temperature, e.g., dodecyl methacrylate. Butyl acrylate and 2-ethyl hexyl acrylate are the most preferred of the monocarylates for use in forming the core. The polymers produced from most methacrylates have glass transition temperatures which are too high to provide rubber-like properties at normally encountered temperatures. Hence, except for special use applications, the monoacrylate component of the core will be either an ester (or esters) of acrylic acid or a mixture of a major amount of the same and a minor amount of methacrylate.

Suitable crosslinking agents include, but not by way of limitation, 1,3-butylene diacrylate, 1,3-butylene dimethacrylate, divinyl benzene, 1,6-hexamethylene diacrylate, 1,6-hexamethylene dimethacrylate, 1,1,1-trimethylolethane triacrylate, 1,1,1-trimethylolethane trimethacrylate, 1,1,1-trimethylolpropane triacrylate, 1,1,1-trimethylolpropane trimethacrylate, 1,4 - dimethylolcyclohexane dimethacrylate, allyl acrylate, allyl methacrylate, methallyl acrylate, methallyl methacrylates, diallyl maleate, diallyl fumarate and diallyl phthalate. In one embodiment, the crosslinking agent is a diester of acrylic or methacrylic acid and a $C_2$-$C_8$, preferably $C_2$-$C_6$, dihydric alcohol. In another embodiment, the crosslinking agent is a triester of acrylic or methacrylic acid and a $C_2$-$C_8$, preferably, trihydric alcohol.

In the first reaction stage, there is preferably employed about 80 to about 98 mole percent of a monofunctional, monoacrylate and about 20 to about 2 mole percent of the crosslinking agent.

In the second reaction stage, it is preferred to use a mixture of about 65 to about 99, preferably about 70 to about 95 mole percent methyl methacrylate and about 1 to about 35, preferably about 5 to about 30, mole percent of a hydroxyalkyl acrylate. These are added before the first reaction ceases. The amounts of the second stage reactants relative to the combined first stage reactants may vary widely, depending upon the physical properties desired in the final product, i.e., from about 10 to about 90 to about 90 to about 10 weight percent.

The methyl methacrylate concentration in the outer shell is advisedly at least about 30 mole percent with a balance of the monofunctional component being made up of monofunctional monoacrylates, e.g., esters of $C_2$-$C_8$ monohydric alcohols and either acrylic or methacrylic acid, or monofunctional vinyl hydrocarbons such as styrene and methyl substituted styrenes, e.g., alpha methyl styrene. It will also be advantageous at times to have a limited amount of crosslinking in the outer shell and hence to include in said "balance" a minor amount of a diacrylate, e.g., 1 to 30 mole percent of a diester of acrylic or methacrylic acid and a $C_2$-$C_8$ dihydric alcohol, or divinyl hydrocarbon, e.g., 1 to 30 mole percent of divinyl benzene. The physical properties of the outer shell may also be modified by replacing up to about 30 mole percent of the methyl methacrylate with acrylonitrile or methacrylonitrile.

The initial monomer charge is usually emulsified by one or more micelle-forming compounds composed of a hydrophobic part such as a hydrocarbon group containing eight or more carbon atoms, and a hydrophilic part, such as alkaline metal or ammonium carboxylate groups, phosphate or sulfate partial ester groups, sulfonate groups, and the like. Exemplary emulsifying agents including alkyl metal sulfonates of styrene, naphthalene, decyl benzene and dodecyl benzenes; sodium dodecyl sulfates; sodium stearate; sodium oleate; sodium alkyl aryl sulfonates; polyoxythylene sulfates and phosphates; the ethylene oxide with long chain fatty acids, alcohols, and mercaptans condensates and the alkyl metal salts of resin acids. These materials and techniques of emulsion formation and maintenance are well known to the art and have no unusual application here. As they are conventional materials employed in a conventional manner. further description is unnecessary.

The polymerization initiator is composed of one or more water-soluble, free-radical-generating species such as hydrogen peroxide or sodium, potassium, or ammonium persulfates, perborates, peracetates, percarbonates and the like. As is well known in the art, these initiators may be associated with activating systems such as redox systems which may incorporate mild reducing agents such as sulfites and thiosulfites and redox reaction promoters such as transition metal ions.

A chain transfer agent or a mixture of chain transfer agents may be added to the reaction medium to limit the molecular weight of the polymer. Such chain transfer agents are generally mercaptans such as dodecane thiol, pentane thiol and butene thiol.

Those skilled in the art will be aware that other emulsifying agents, polymerization initiators and chain transfer agents may be used when compatible with the polymerization system herein employed.

The reaction may be carried out at temperatures from about 40° C. to about 80° C., or at lower temperatures, as from 0° C. to 80° C. in the case of activated systems.

The graded rubber particles above described and this method of preparation are disclosed by Ray A. Dickie and Seymour Newman in their patent application Ser. No. 100,464 filed of even date with this application.

In another method of preparation, hereinafter illustrated, the rubber particles are formed in an aliphatic hydrocarbon medium.

(III) The diisocyanate reactant

The preferred diisocyanate for use in this invention is toluene diisocyanate and this may be either the 2,4- or 2,6-isomer or a mixture thereof. This diisocyanate may be used without blocking or one of the isocyante groups thereof may be blocked with caprolactam or other suitable blocking agents before use. One may also use other diisocyanates so long as one of the isocyanate groups is blocked with a suitable blocking agent. Representative of other diisocyanates which can be monoblocked and used herein are the following: 4,4' diphenylmethane diisocyanate, 1-phenoxy-2,4-phenylene diisocyanate, 1-tert-butyl-2,4-phenylene diisocyanate, and 1-ethyl-2,4-phenylene diisocyanate. Such blocking allows for separate stage reactions of the two isocyanate groups. Other blocking agents such as phenols and tertiary butyl alcohol may also be used. The blocking agents are selected so that the blocked isocyanate group is converted to free isocyanate group in a temperature range of about 120° to about 170° C. Sometimes catalysts such as triethylene diamine or stannous octoate may be added and advantageously used in 0.05 to 1 percent concentration (basis weight of reactants) to assist the deblocking process.

A diisocyanate can be monoblocked with caprolactam by reacting the two in toluene. When the first isocyanate group is blocked, the monoblocked product precipitates out of solution. See, Raymond R. Myers and J. S. Long, Film-Forming Compositions, vol. 1, part I, page 485, published by Marcel Dekker, Inc., New York, N.Y., U.S.A. (1961).

(IV) The hydroxyalkyl acrylate reactant

A hydroxyalkyl acrylate is reacted with the second diisocyanate group in the next step of the process. This component is preferably employed in slight excess of the amount required to react with the remaining isocyanate groups. The preferred hydroxyalkyl acrylates are hydroxyethyl acrylate, hydroxyethyl methacrylate, hydroxypropyl acrylate, hydroxypropyl methacrylate.

(V) Vinyl monomers employed in the paint dispersion

The paint binder dispersion advantageously contains about 20 to about 80, preferably about 25 to about 75, weight percent vinyl monomers and about 20 to about 80, preferably about 25 to about 75, weight percent of the polymeric component. This polymeric component consists essentially of the rubber-urethane-acrylate addition product hereinbefore described and the alpha-beta, olefinically unsaturated, vinyl resin hereinbefore described. The relative concentrations of these two constituents of the polymeric component may vary widely, e.g., the polymeric component may comprise about 2 to about 98, preferably 5 to 95, weight percent of the alpha-beta olefinically unsaturated vinyl resin and about 98 to about 2, preferably 95 to 5, weight percent of the rubber-urethane-acrylate addition product.

Monomer type and concentration provide one means for adjusting the viscosity of the paint dispersion to conform to the methods of application desired, e.g., spray coating, roll coating, etc. In functional terms, the amount of vinyl monomer present is at least sufficient to convert the alpha-beta, olefinically unsaturated, rubber-urethane-acrylate addition product and the alpha-beta, olefinically unsaturated, vinyl resin into a crosslinked continuous coating on the surface of a substrate when a film of such coating dispersion is applied thereto and exposed to ionizing radiation, e.g., an electron beam.

Vinyl monomers employed may be monofunctional monoacrylates, especially esters of acrylic or methacrylic acid and a $C_1$–$C_8$, preferably a $C_1$–$C_6$ monohydric alcohol, e.g., methyl methacrylate, ethyl acrylate, butyl acrylate, butyl methacrylate, 2-ethyl hexyl acrylate, etc. The monomer mixture may also include a minor amount, e.g., 1 to 30 mole percent, of diacrylates, e.g., the diesters of acrylic or methacrylic acid and a $C_2$–$C_6$ diol such as 1,3-butylene diacrylate, 1,3-butylene dimethacrylate, 1,6-hexamethylene diacrylate, 1,6-hexamethylene dimethacrylate, ethylene glycol dimethacrylate, etc.

Monovinyl hydrocarbons, e.g., styrene, alpha methyl styrene, vinyl toluene, etc., may also be used either alone or in combination with the aforementioned monoacrylates. Minor amounts, e.g., about 1 to about 30 mole percent of the vinyl monomer mixture may be made up of a divinyl hydrocarbon such as divinyl benzene. Other vinyl monomers, e.g., acrylonitrile, methacrylonitrile, vinyl acetate, etc., may be employed in minor amounts, e.g., about 1 to about 30 mole percent.

Advantageously, at least 70 weight percent of the vinyl monomer component is made up of monoacrylates selected from esters of a $C_1$–$C_8$ monohydric alcohol and acrylic or methacrylic acid and/or monovinyl hydrocarbons having about 8 to about 9 carbon atoms. Frequently, it is advantageous to use a mixture of about 40 to about 60 mole percent of these monoacrylates and about 60 to about 40 mole percent of these monovinyl hydrocarbons.

(VI) Preparation and application of the coating dispersion to a substrate

By adjusting the viscosity of the coating dispersion to a viscosity compatible with the desired method of coating, these coatings may be applied by any of the conventional methods, e.g., brushing, spraying, roll coating, curtain coating, flow coating, etc.

The viscosity of the paint binder solution can be adjusted by varying the molecular weight of the rubber-urethane-acrylate addition product. This may be accomplished by controlling the average number of functional groups per molecule through control of the concentration of the hydroxyalkyl acrylate constituent in the final portion of the monomer mixture introduced into the reaction medium when the graded rubber particle is produced. The viscosity may also be regulated by varying the relative concentration of the polymeric component with respect to the vinyl monomer component and/or by varying the relative concentrations of dissimilar monomers within the vinyl monomer component. The paint binder dispersion may be applied to the substrate essentially free of non-polymerizable organic solvents and/or diluents or it may be applied with the solvent and/or diluents in a method of application wherein the solvents and/or diluents are flashed off prior to polymerization.

Coatings may be applied to any substrate, e.g., metal, wood, glass, shaped polymeric solids, etc. These coatings will ordinarily be applied to an average depth in the range of about 0.1 to about 4 mils more commonly about 0.5 to about 2 mils.

(VII) Curing the coatings

Films formed of the paints of this invention can be cured with ionizing radiation at relatively low temperatures, e.g., room temperature (20° to 25° C.) or a temperature between room temperature and that temperature at which significant vaporization of its most volatile component is initiated, ordinarily between 20° C. and 75° C. The radiation energy is applied at dose rates of about 0.1 to about 100 mrad per second on a workpiece, preferably a moving workpiece, with the coating receiving a total dose in the range of about 1 to about 25, commonly about 8 to about 15 mrad.

The term "ionizing radiation" as employed herein means radiation having sufficient energy to remove an electron from a gas atom, forming an ion, preferably radiation with minimum energy of, or equivalent to, at least about 5,000 electron volts except when the curing is carried out in a vacuum. The preferred method of curing films of the instant paint binders on the substrates to which they have been applied is by subjecting such films to a beam of polymerization-effecting electrons which at its source of emission is within the range of, or equivalent to, about 100,000 to about 500,000 electron volts. If irradiation is carried out in vacuum or at reduced pressure, this energy range may be considerably lower. In this method of curing, it is preferred to employ a minimum of about 25,000 volts per inch of distance between the radiation emitter and the workpiece where the intervening space is occupied by air or other gas of comparable density. Adjustment is made for the relative resistance of the intervening gas which is preferably an oxygen-free inert gas such as nitrogen or helium.

In this application, the term "paint" is meant to include finely ground pigment and/or filler in the binder, the binder without pigment and/or filler or having very little of the same, which can be tinted if desired. Thus, the binder which is ultimately converted to a durable film resistant to wear, weather, etc., can be all or virtually all that is used to form the film, or it can be a vehicle for pigmentary and/or mineral filler material.

The abbreviation "mrad" as employed herein means one million rad. The term "rad" as employed herein means that dose of radiation which results in the absorption of 100 ergs of energy per gram of absorber, i.e., coating film. The electron emitting means may be a linear electron accelerator capable of producing a direct current potential in the range hereinbefore mentioned. In such device, electrons are ordinarily emitted from a hot filament and accelerated through a uniform voltage gradient. The electron beam, which may be about ⅛ inch in diameter at this point, is then scanned in one direction to make a fan-shaped beam and then passed through a metal window, e.g., aluminum, aluminum-copper alloy, or a magnesium-thorium alloy of about 0.003 inch thickness. This invention will be more fully understood from the following examples:

EXAMPLE 1

(I) Graded rubber particles are prepared in aqueous medium using the following procedures: To 1,000 parts by weight water which has been boiled and cooled to room temperature under a nitrogen atmosphere are added 2.86 parts by weight sodium dodecyl sulfate dissolved in 35.7 parts by weight water and about ⅑ of a monomer mixture consisting of 521 parts butyl acrylate and 48.5 parts by weight 1,3-butylene dimethacrylate. This mixture is stirred to establish dispersion of the monomers and 3.14 parts by weight potassium persulfate dissolved in 71.4 parts by weight water are added to the stirred mixture. This mixture is heated to 45° C. After about 10 minutes, addition of the remainder of the first monomer mixture is added at a rate such that the temperature of the reaction mixture is maintained at 47° to 50° C. During the addition of the last ⅔ of the first monomer mixture, 5.72 parts by weight sodium dodecyl sulfate dissolved in 35.7 parts by weight water are added at a substantially constant rate. The reaction mixture is maintained at about 47° to 50° C. for about sixty minutes prior to beginning simultaneous dropwise addition of the mixture of 1180 parts by weight methyl methacrylate and 425 parts by weight hydroxyethyl methacrylate, 30 parts by weight dodecyl mercaptan, and 2.86 parts by weight sodium dodecyl sulfate dissolved in 35.7 parts by weight water. This addition, which requires about 30 minutes, is carried out at a rate such that the temperature of the reaction mixture is maintained at about 47° to 50° C. Following this addition, the mixture is maintained at 47° to 49° C. for an additional two hours.

The emulsion is then coagulated by addition of 20 grams of concentrated hydrochloric acid solution and 100 ml. of water. The rubber particles are isolated by filtration and washed with methanol containing 1 weight percent of hydrochloric acid. The particles are then dried.

(II) Determination of the concentration of the reactive hydroxyl groups on the surfaces of the particles is made by the well-known method analysis wherein the hydroxy groups are reacted with acetic acid using a pyridine catalyst. The acetic acid is then back titrated with sodium hydroxide. For details, reference is made to A. Steyermark, Quantitative Organic Analysis, pp. 302-303, published by Blakiston Company, New York, Toronto and Philadelphia (1951).

(III) The hydroxy-functional graded rubber particles prepared in I above are reacted with a diisocyanate using the following procedure. The hydroxy-functional particles in the quantity providing one mole of reactive hydroxyl groups on the collective surfaces thereof are suspended in toluene and 2,4-toluene diisocyanate, in the quantity necessary to provide about 3 isocyanate groups per each hydroxyl group, is incrementally added at a rate slow enough to keep the temperature of the reaction mix below 32° C. after the initial exotherm subsides, the reaction mixture is stirred for one hour.

(IV) The rubber-diisocyanate adduct is reacted with a hydroxyalkyl acrylate using the following procedure: The temperature of the reaction mix is raised to about 45° C. and hydroxyethyl methacrylate monomer is added in slight excess (e.g., 5 to 7 percent excess) of that required to react with the unreacted isocyanate groups. It is added slowly and incrementally and the reaction is stirred continuously for several hours. The solvent is removed under vacuum until the solvent content of the product mix is less than 15 percent. A rubber-urethane-acrylate product, hereinafter referred to as a resin, is ready for employment in the coating compositions.

(V) Paint dispersions are prepared from the rubber-urethane-acrylate resin, vinyl monomers and an alpha-beta, olefinically unsaturated vinyl resin prepared by the following procedure:

| Starting materials | Mol | Grams |
| --- | --- | --- |
| (a) Methyl methacrylate | 2.6 | 260.0 |
| (b) Ethyl acrylate | 5.0 | 500.0 |
| (c) Glycidyl methacrylate | 1.7 | 240.0 |
| (d) Methacrylic acid | 1.7 | 146.5 |
| (e) Xylene | | 1,000 ml. |
| (f) Benzoyl peroxide | | 10.0 |
| (g) Hydroquinone | | 0.2 |

Procedure

The xylene is heated to 130° C. under a nitrogen blanket and stirred continuously. The monomers (a), (b) and (c) and the reaction initiator (f) are added to the xylene. The monomers (a), (b) and (c) are added separately and incrementally over a period of three hours. The charge is heated at 130°-133° C. for about three hours. The charge is cooled to about 50° C. The hydroquinone (g) is added to the charge. The methacrylic acid (d) is added to the charge and the temperature is raised to 138° C. gradually over a period of about 1.5 hours. This temperature is maintained for about one hour and the xylene is removed under vacuum.

A first paint dispersion is prepared using 50 parts by weight of this copolymer of vinyl monomers, 25 parts by weight of the rubber-urethane-acrylate resin and about 25 parts by weight methyl methacrylate. A second paint dispersion is prepared using about 25 parts by weight of this copolymer of vinyl monomers, about 50 parts by weight of the rubber-urethane-acrylate resin, and about 25 parts by weight methyl methacrylate. A third paint dispersion is prepared using about 30 parts by weight of this copolymer of vinyl monomers, about 10 parts by weight of the rubber-urethane-acrylate resin and about 60 parts by weight methyl methacrylate. A fourth paint dispersion is prepared by using about 40 parts by weight of this copolymer vinyl monomers, about 5 parts by weight of the rubber-urethane-acrylate resin, and about 55 parts by weight of methyl methacrylate.

(VI) Coating of substrates: The dispersions prepared in V above are separately coated on substrates of steel, wood, glass, and polymeric solid, i.e., acrylonitrile-butadiene-styrene copolymer, to an average depth of about 7/10 mil (0.0007 inch) and irradiated with an electron beam. The conditions of irradiation are as follows:

Potential—275 kv.
Current—30 milliamperes
Distance, emitter from workpiece—10 inches
Dose—10 mrad
Atmosphere—nitrogen

EXAMPLE 2

The procedure of Example 1 is repeated with the difference that an equimolar amount of ethyl acrylate is substituted for the butyl acrylate used in the first monomer mixture to form the core of the graded rubber particle and ½ of the methyl methacrylate used to form the coating dispersions with the copolymer of vinyl monomers (vinyl resin) and the rubber-urethane-acrylate addition product is replaced with an equimolar amount of styrene.

EXAMPLE 3

The procedure of Example 1 is repeated with the differences that an equimolar amount of 2-ethyl hexyl acrylate is substituted for the butyl acrylate used in the first monomer mixture to form the core of the graded rubber particles, the second monomer mixture used to form the shell of the graded rubber particles is a mixture of about 40 mole percent methyl methacrylate, 15 mole percent ethyl acrylate, 10 mole percent butyl acrylate, 10 mole percent acrylonitrile, 25 mole percent hydroxyethyl acrylate and the vinyl monomer component used to form the coating dispersion with the rubber-urethane-acrylate addition product and the copolymer of vinyl monomers is a mixture of 30 mole percent methyl methacrylate, 20 mole percent butyl methacrylate, 10 mole percent 2-ethyl hexyl acrylate, 20 mole percent styrene and 20 mole percent vinyl toluene. The second monomer mixture is divided into four equal fractions each of which is added incrementally. The hydroxyethyl acrylate is added to the reaction mixture with the last of these fractions.

EXAMPLE 4

The procedure of Example 1 is repeated with the difference that an equimolar amount of cyclohexyl acrylate is substituted for the butyl acrylate and a equimolar amount of 1,3-butylene diacrylate is substituted for the 1,3-butylene dimethacrylate used in the first monomer mixture to form the core of the graded rubber particles, the second monomer mixture used to form the shell of the graded rubber particles is a mixture of 30 mole percent methyl methacrylate, 15 mol percent methacrylonitrile, 10 mole percent styrene, 10 mole percent 1,3-butylene dimethacrylate, 5 mole percent vinyl acetate and 30 mole percent hydroxypropyl methacrylate, and the vinyl monomer component used to form the coating dispersion with the rubber-urethane-acrylate addition product and the copolymer of vinyl monomers is a mixture of 70 mole percent of methyl methacrylate, 20 mole percent alpha methyl styrene and 10 mole percent 1,3-butylene dimethacrylate.

EXAMPLE 5

The procedure of Example 1 is repeated with the difference that an equimolar amount of 1,6-hexamethylene diacrylate is substituted for the 1,3-butylene dimethacrylate used in the first monomer mixture to form the core of the graded rubber particle.

EXAMPLE 6

The procedure of Example 1 is repeated with the differences that an equimolar amount of divinyl benzene is substituted for the 1,3-butylene dimethacrylate used in the first monomer mixture to form the core of the graded rubber particle, the second monomer mixture used to form the shell fo said particle is a mixture of 50 mole percent methyl methacrylate, 10 mole percent acrylonitrile, 10 mole percent divinyl benzene and 30 mole percent hydroxypropyl acrylate and the vinyl monomer component used to form the coating dispersion with the rubber-urethane-acrylate addition product and the copolymer vinyl monomer is a mixture of 60 mole percent methyl methacrylate, 20 mole percent styrene, 10 mole percent butyl acrylate and 10 mole percent divinyl benzene.

EXAMPLE 7

The procedure of Example 1 is repeated with the differences that a single paint dispersion is prepared using 60 weight percent of the methyl methacrylate and 40 weight percent of a polymeric component of which 50 weight percent is the rubber-urethane-acrylate addition product and 50 weight percent is the copolymer of vinyl monomers.

EXAMPLE 8

The procedure of Example 1 is repeated with the differences that a single paint dispersion is prepared using 40 weight percent of the methyl methacrylate and 60 weight percent of the polymeric component which is made up of 50 weight percent of the rubber-urethane-acrylate addition product and 50 weight percent of the copolymer of vinyl monomers, i.e., the vinyl resin.

EXAMPLE 9

The procedure of Example 1 is repeated except for the differences that the second monomer mixture introduced into the reaction mixture to form the shell of the hydroxy-functional graded rubber product is a mixture of about 95 mole percent methyl methacrylate and about 5 mole percent hydroxyethyl methacrylate. The second monomer mixture is divided into ten equal fractions each of which is added incrementally. The hydroxethyl methacrylate is added to the reaction mixture with the last 1/10 of the monomer mixture.

EXAMPLE 10

The procedure of Example 1 is repeated except for the differences that the second monomer mixture introduced into the reaction mixture to form the shell of the hydroxy-functional graded rubber product is a mixture of about 85 mole percent methyl methacrylate and about 15 mole percent hydroxyethyl acrylate. The second monomer mixture is divided into five equal fractions each of which is added incrementally. The hydroxyethyl acrylate is added to the reaction mixture with the last 1/5 of the monomer mixture.

EXAMPLE 11

The procedure of Example 1 is repeated with the differences that the curing is carried out in a helium atmosphere and the potential of the electron beam upon exiting from the electron window into such atmosphere is about 260 kv.

EXAMPLE 12

The procedure of Example 1 is repeated with the differences that the curing is carried out in a nitrogen atmosphere containing a minor amount of $CO_2$ and the potential of the electron beam upon exiting from the electron window into such atmosphere is about 295 kv.

EXAMPLE 13

Substrates are coated in accordance with this invention using the following procedure:

(I) Graded rubber particles are prepared in an organic medium using the procedures set forth below:

(A) A mixture is formed from the following:

| Materials: | Grams |
|---|---|
| Ethyl acrylate | 400 |
| 1,3 - butylene dimethacrylate | 100 |
| Dispersing agent [1] | 15 |
| AIBN [2] | 5 |

[1] Amphiphatic copolymer (1 portion soluble in the acrylic monomers and the other portion soluble in the solvent, e.g., dodecane) is prepared by reacting 12-hydroxystearic acid (300 g.) in the presence of stearyl alcohol (310 g.) and p-toluene sulfonic acid (6 g.) at 180°–190° C. until the acid value is less than 1 mg. KOH/g. The product is then reacted with methacrylic anhydride (170 g.) the resulting material is then copolymerized with an equal amount of methyl methacrylate using AIBN initiator (9 g.) and butyl acetate solvent. This method of producing this dispersing agent is described in detail by K. E. G. Barratt and H. R. Thomas, Journal of Polymer Science, part 1, vol. 7, 2625 (1969). Other dispersing agents which are effective for stabilizing suspensions in hydrocarbon liquids may be used in place of the above described materials.
[2] 2,2'-azobis-(2-methyl propionitrile).

(B) The mixture of the above listed material is added to 1,000 grams n-dodecane under nitrogen. The mix is warmed to 40° C. When the exotherm starts the temperature is allowed to rise to 80° C. The temperature is maintained at 80° C. for 30 minutes.

(C) The reaction mixture is maintained in a nitrogen atmosphere and there is added slowly with stirring a mixture of the following materials:

| Materials: | Grams |
|---|---|
| Methyl methacrylate | 320.0 |
| Hydroxyethyl methacrylate | 80.0 |
| Dispersing agent [1] | 3.0 |
| AIBN | 6.0 |
| n-Dodecane | 1000.0 |

[1] Same as 1–A(1).

(II) The hydroxy-functional graded particles prepared in I above are related with a diisocyanate using the following procedure: The temperature of the reaction mixture is allowed to cool to 30° C. There is added slowly 132 g. of 2,4-toluene diisocyanate. The temperature is maintained in the range of 30°–35° C. for 2 hours.

(III) There is added to the reaction mix 125 grams of hydroxy-ethyl methacrylate. The reaction mix is then heated at 45° C. for 4 hours. The rubber-urethane-acrylate addition product particles are separated from the solvent by filtration.

(IV) A paint dispersion is prepared using 40 parts by weight of an equimolar mixture of methyl methacrylate and styrene, and 60 parts by weight of a polymeric component consisting of 58 parts by weight of an alpha-beta olefinically unsaturated vinyl resin [1] and 2 parts by weight of the rubber-urethane-acrylate addition product.

[1] This vinyl resin is prepared from the following materials using the following procedure:

| Materials: | Parts by weight |
|---|---|
| (a) Xylene | 600.0 |
| (b) Methyl methacrylate | 196.0 |
| (c) Ethyl acrylate | 333.0 |
| (d) Glycidyl methacrylate | 71.0 |
| (e) Azobisiso butyronitrile | 6.0 |
| (f) Hydroquinone | 0.12 |
| (g) Methacrylic acid | 42.0 |
| (h) Triethyl amine | 0.96 |

Procedure

The reaction solvent, xylene, is charged to a flask fitted with a stirring rod, an addition funnel, a thermometer, a nitrogen inlet tube and a condenser. The amount of xylene is equal to the total weight of vinyl monomers to be added. The xylene is heated to reflux, and nitrogen is bubbled through the solution during heat-up and throughout the reaction. The combined monomers and initiator (azobisiso butyronitrile) are added to the refluxing solution evenly over a 2 hour period. The initiator weight is 10 parts by weight per 1,000 parts by weight vinyl monomers. The reaction solution is refluxed until the conversion of monomers to polymer is greater than 97 percent (8–16 hours). In the second step, hydroquinone is added as an inhibiter and then the methacrylic acid is added to react with the residual epoxy groups on the polymer. Triethyl amine is used as a catalyst. This esterification reaction is carried out at reflux temperatures until 80 percent esterification is accomplished (determined by residual acid number). The xylene is then removed by vacuum distillation.

(V) Coating of substrates: The paint dispersion prepared in IV is sprayed upon substrates of steel, aluminum, glass, paper, wood, and polymeric solid, i.e., polypropylene, to an average depth of about 1.5 mils and cured thereon by placing said substrates into a nitrogen atmosphere and exposing the coated surfaces to an electron beam (potential 275 kv.—current 30 milliamperes) until the coatings on the surfaces of the substrates are tack-free to the touch.

EXAMPLE 14

The procedure of Example 13 is repeated with the differences that an equimolar amount of 1-tert-butyl-2,4-phenylene diisocyanate with 1 isocyanate group per molecule blocked with caprolactam is substituted for the 2,4-toluene diisocyanate in the reaction of diisocyanate with hydroxy-functional graded rubber in Section II of the procedure of Example 13 and the procedure of Section III of Example 13 is modified in that, as the hydroxyethyl methacrylate monomer is dispersed in the reaction mixture, the temperature of the reaction mixture is raised to about 150° C. while the reaction mixture is stirred for about 30 minutes.

EXAMPLE 15

The procedure of Example 13 is repeated with the differences that an equimolar amount of 1-ethyl-2,4-phenylene diisocyanate is substituted for the 2,4-toluene diisocyanate in the reaction of diisocyanate with hydroxy-functional graded rubber in Section II of the procedure of Example 13 and the procedure of Section III of Example 13 is modified in that, as the hydroxyethyl methacrylate monomer is dispersed in the reaction mixture, the temperature of the reaction mixture is raised to about 150° C. and maintained at a temperature of about 150° C. while the reaction mixture is stirred for about 30 minutes.

EXAMPLE 16

The procedure of Example 13 is repeated with the differences that an equimolar amount of 4,4'-diphenylmethane diisocyanate with 1 isocyanate group per molecule blocked with caprolactam is substituted for the 2,4-toluene diisocyanate in the reaction of diisocyanate with hydroxy-functional graded rubber in Section II of the procedure of Example 13 and the procedure of Section III of Example 13 is modified in that, as the hydroxyethyl methacrylate monomer is dispersed in the reaction mixture, the temperature of the reaction mixture is raised to about 150° C. and maintained at a temperature of about 150° C. while the reaction mixture is stirred for about 30 minutes.

EXAMPLE 17

The procedure of Example 13 is repeated with the differences that an equimolar amount of 1-phenoxy-2,4-phenylene diisocyanate with 1 isocyanate group per molecule blocked with caprolactam is substituted for the 2,4-toluene diisocyanate in the reaction of diisocyanate with hydroxy-functional graded rubber in Section II of the procedure of Example 13 and the procedure of Section III of Example 13 is modified in that, as the hydroxyethyl methacrylate monomer is dispersed in the reaction mixture, the temperature of the reaction mixture is raised to about 150° C. and maintained at a temperature of about 150° C. while the reaction mixture is stirred for about 30 minutes.

EXAMPLE 18

The procedure of Example 13 is repeated except that an equivaent amount of acrylic acid is substituted for the methacrylic acid used in preparing the vinyl resin.

EXAMPLE 19

The procedure of Example 13 is repeated except that the methacrylic acid component is substituted for the glycidyl methacrylate component in the first step of the procedure and the glycidyl methacrylate is substituted for the methacrylic acid component in the second step of the procedure.

EXAMPLE 20

The procedures of Examples 1 and 13 are repeated with the differences that the alpha-beta olefinically unsaturated vinyl resin is prepared from the following materials using the following procedures:

| Materials: | Parts by weight |
|---|---|
| (a) Ethyl acrylate | 38.8 |
| (b) Methyl methacrylate | 23.2 |
| (c) Allyl glycidyl ether | 37.0 |
| (d) Benzoyl peroxide | 1.0 |
| Xylene | Solvent |

Procedure (I)

To a reaction vessel provided with a condenser, thermometer, agitator, and dropping funnel there are charged an amount of xylene equal in weight to the reactants to be added in the first reaction step. The xylene is heated to about 100°–120° C. The reactants and catalyst are thoroughly mixed and added slowly with a dropping funnel to the heated xylene over a period of 4 hours. The reaction is held at this temperature for 1–2 hours after addition is complete and then allowed to cool to room temperature.

(II)

| Materials: | Parts by weight |
|---|---|
| Copolymer from Step I | 69.4 |
| Allyl alcohol | 30.4 |
| Potassium hydroxide | 0.2 |

A solution of the allyl alcohol and the potassium hydroxide is added to the copolymer at room temperature. The mixture is then heated to a temperature of 100°–120° C. This temperature is maintained for about 7 hours and allowed to cool. The vinyl polymer reaction mixture is heated to about 60° C. and the xylene and excess reactants are removed by vacuum distillation. About 0.07 part by weight hydroquinone and the amount of vinyl monomers to be used in the paint dispersion are added to the copolymer at this time.

EXAMPLE 21

The procedure of Example 13 is repeated except that the vinyl resin is prepared from the following ingredients in the manner hereinafter set forth:

| Starting materials: | Parts by weight |
|---|---|
| (a) Ethyl acrylate | 39 |
| (b) Methyl methacrylate | 24 |
| (c) Allyl alcohol | 36 |
| (d) Benzoyl peroxide | 1 |

Procedure

(I)

To a reaction vessel provided with a condenser, thermometer, agitator, and dropping funnel there are charged an amount of xylene equal in weight to the reactants to be added in the first reaction step. The xylene is heated to about 100°–120° C. The reactants and the catalysts are thoroughly mixed and added slowly with a dropping funnel to the heated xylene over a period of 4 hours. The reaction is held at this temperature for 1 to 2 hours after addition is complete and then allowed to cool to room temperature.

(II)

| Materials: | Parts by weight |
|---|---|
| Copolymer from Step I | 69 |
| Allyl glycidyl ether | 30.8 |
| Potassium hydroxide | 0.2 |

A solution of the allyl glycidyl ether and potassium hydroxide is added to the copolymer at room temperatures. The mixture is then heated to a temperature of 100°–120° C. This temperature is maintained for about 7 hours and allowed to cool. The vinyl polymer reaction mixture is heated to about 60° C. and the xylene and excess reactants are removed by vacuum distillation. The monomers to be used in the paint dispersion and about 0.07 part by weight of hydroquinone are added to the vinyl resin.

EXAMPLE 22

The procedure of Example 13 is repeated except that the vinyl resin is prepared from the following materials in the manner hereinafter set forth:

I

| Starting materials: | Parts by weight |
|---|---|
| (a) Methyl methacrylate | 400 |
| (b) Ethyl acrylate | 400 |
| (c) Hydroxyethyl methacrylate | 195 |
| (d) Toluene | 1000 |
| (e) Benzoyl peroxide | 30 |

The benzoyl peroxide is dissolved in a solution of the methyl methacrylate, ethyl acrylate and hydroxyethyl methacrylate and one half of the toluene. This solution is added incrementally to the remainder of the toluene and reflux over a 7 hour period with a final pot temperature of about 138°–140° C. Reflux is maintained for another 3 hours and the solution cooled.

II

| Starting materials: | Parts by weight |
|---|---|
| Solution from Step I | 500 |
| Acrylyl chloride | 33.8 |
| Toluene | 30 |

The solution from Step I is heated to 60° C. and the solution of the acrylyl chloride and toluene are added dropwise over a 4 hour period while the temperature is allowed to rise to about 90° C. After heating for another 2.5 hours, this solution is subjected to vacuum below 10 mm. Hg at 70° C. and the acrylic polymer is recovered.

EXAMPLE 23

The procedure of Example 13 is repeated except that vinyl resin is prepared from the following materials in the manner hereinafter set forth: One hundred (100) parts by weight of a styrene allyl alcohol copolymer containing 21.4 weight percent allyl alcohol and having an average molecular weight of about 1,620 and 0.1 part by weight hydroquinone are dissolved in toluene and heated to 90° C. To this solution, 41.8 parts by weight of methacrylyl chloride in toluene are added dropwise over a 1 hour period. Heating is continued and the temperature is allowed to rise to toluene reflux until essentially complete cessation of gas liberation is obtained after an additional 5 hours. The solvent is removed by vacuum.

EXAMPLE 24

The procedure of Example 13 is repeated except that the depth of coating is varied in separate tests using films of 0.2, 0.5, 1.0, 2.0 and 3.5 mils. Irradiation is continued until tack-free films are achieved.

EXAMPLE 25

The procedure of Example 1 is repeated with the difference that the paint dispersion consists of 40 parts by weight of an equimolar mixture of methyl methacrylate and styrene and 60 parts by weight of a polymeric component consisting of 55 parts by weight of the alpha-beta olefinically unsaturated, vinyl resin and about 5 parts by weight of the rubber-urethane-acrylate addition product.

EXAMPLE 26

The procedure of Example 13 is repeated with the difference that the paint dispersion consisting of 40 parts by weight styrene and 60 parts by weight of a polymeric component consisting of 50 parts by weight of the alpha-beta olefinically unsaturated, vinyl resin and about 10 parts by weight of the rubber-urethane-acrylate addition product.

EXAMPLE 27

The procedure of Example 1 is repeated with the difference that the paint dispersion consists of 40 parts by weight methyl methacrylate and styrene in an equimolar mixture and 60 parts by weight of a polymeric component consisting of 5 parts by weight of the alpha-beta olefinically unsaturated, vinyl resin and 55 parts by weight of the rubber-urethane-acrylate addition product.

EXAMPLE 28

The procedure of Example 13 is repeated with the difference that the paint dispersion consists of 60 parts by weight of a vinyl monomer mixture made up of 30 mole percent methyl methacrylate, 20 mole percent ethyl acrylate, 10 mole percent butyl methacrylate, 10 mole butyl acrylate, 15 mole percent 2-ethyl hexyl acrylate and 15 mole percent styrene and 40 parts by weight of a polymeric component consisting of about 10 parts by weight of the olefinically unsaturated vinyl resin and about 50 parts by weight of the rubber-urethane-acrylate addition product.

EXAMPLE 29

The procedures of Examples 1 and 13 are repeated except for the differences that a functionally equivalent amount of 1,1,1-trimethylolethane triacrylate is substituted for the 1,3-butylene dimethacrylate in the formation of the hydroxy-functional graded rubber particle.

EXAMPLE 30

The procedures of Examples 1 and 13 are repeated except for the differences that a functionally equivalent amount of 1,1,1-trimethylolpropane trimethacrylate is substituted for the 1,3-butylene dimethacrylate in the formation of the hydroxy-functional graded rubber particle.

EXAMPLE 31

The procedures of Examples 1 and 13 are repeated except for the difference that a functionally equivalent amount of 1,4-dimethylolcyclohexane dimethacrylate is substituted for the 1,3-butylene dimethacrylate in the formation of the hydroxy-functional graded rubber particle.

The terms "acrylate" and "acrylates," when used herein without a modifier distinguishing between esters of acrylic acid and methacrylic acid shall be understood to include both. This, of course, does not apply to a naming of a specific compound.

It will be understood by those skilled in the art that modifications can be made within the foregoing examples in the scope of the invention as hereinbefore described and hereinafter claimed.

We claim:

1. A radiation-curable paint which on a pigment and mineral filler-free basis comprises a film-forming dispersion of about 20 to about 80 weight percent vinyl monomers and about 80 to about 20 weight percent of a polymeric component consisting essentially of (A) about 2 to about 98 weight percent of an alpha-beta olefinically unsaturated vinyl resin having average molecular weight in excess of about 1,000, containing about 0.5 to about 5 units of alpha-beta olefinic unsaturation per 1,000 units molecular weight, and being further characterized in that its longest carbon-to-carbon chain is a copolymer wherein about 50 mole percent of the constituent monomers are selected from the group consisting of acrylic monomers and aromatic vinyl hydrocarbon monomers, the alpha-beta olefinic unsaturation thereof is terminal with respect to a lesser carbon-to-carbon chain that is pendant from said longest carbon-to-carbon chain and separated therefrom by a linking group selected from the group consisting of ester groups and ether groups and (B) about 98 to about 2 weight percent of a rubber-urethane-acrylate addition product formed by reacting a first isocyanate group of a diisocyanate with a hydroxy-functional particle of graded rubber and reacting the remaining isocyanate group of said diisocyanate with a hydroxyalkyl acrylate, said particle of graded rubber consisting essentially of (1) about 10 to about 90 weight percent of a core of crosslinked acrylic polymer consisting essentially of
   (a) a minor and crosslinking amount of a di- or tri-functional monomer containing 2 or more nonconjugated terminal ethylenic groups, said minor and crosslinking amount not exceeding about 20 mole percent of the core reactants, and
(2) about 90 to about 10 weight percent of an outer shell having glass transition temperature above that of said core and consisting essentially of the polymerization product of monomer mixtures selected from the group consisting of
   (a) about 65 to about 98 mole percent methyl methacrylate and about 2 to about 35 mole percent of a hydroxy-functional acrylate selected from the group consisting of hydroxyethyl acrylate, hydroxyethyl methacrylate, hydroxypropyl acrylate and hydroxypropyl methacrylate, and
   (b) about 2 to about 35 mole percent of a hydroxy-functional acrylate selected from the group consisting of hydroxyethyl acrylate, hydroxyethyl methacrylate, hydroxypropyl acrylate and hydroxypropyl methacrylate and about 65 to about 98 mole percent of a mixture consisting essentially of esters of acrylic or methacrylic acid and a $C_1$–$C_8$ monohydric alcohol, $C_8$–$C_9$ monovinyl hydrocarbons, 0 to 30 mole percent of a difunctional compound selected from divinyl benzene and diesters of acrylic or methacrylic acid and $C_2$–$C_6$ dihydric alcohol and 0 to 30 mole percent of a difunctional compound selected from divinyl benzene and diesters of acrylic or methacrylic acid and $C_2$–$C_6$ dihydric alcohol and 0 to 30 mole percent of a monomer selected from acrylonitrile, methacrylonitrile and vinyl acetate.

2. A paint in accordance with claim 1 wherein said alpha-beta olefinically unsaturated vinyl resin has between about 0.7 and about 3.5 units of alpha-beta olefinic unsaturation per 1,000 units molecular weight.

3. A paint in accordance with claim 1 wherein said alpha-beta olefinically unsaturated vinyl resin has average molecular weight between 1,000 and about 25,000 and between about 0.7 and about 3.5 units of alpha-beta olefinic unsaturation per 1,000 units molecular weight.

4. A paint in accordance with claim 1 wherein said core is crosslinked acrylic polymer consisting essentially of butyl acrylate and 1,3-butylene dimethacrylate and said vinyl resin has between about 0.7 and about 3.5 units of alpha-beta olefinic unsaturation per 1,000 units molecular weight.

5. A paint in accordance with claim 1 wherein said core is a crosslinked acrylic polymer consisting essentially of 2-ethyl hexyl acrylate and 1,3-butylene dimethacrylate and said vinyl resin has between about 0.7 and about 3.5 units of alpha-beta olefinic unsaturation per 1,000 units molecular weight.

6. A paint in accordance with claim 1 wherein said hydroxyalkyl acrylate is selected from the group consisting of hydroxyethyl acrylate, hydroxyethyl methacrylate, hydroxypropyl acrylate and hydroxypropyl methacrylate and said vinyl resin has between about 0.7 and about 3.5 units of alpha-beta olefinic unsaturation per 1,000 units molecular weight.

7. A paint in accordance with claim 1 wherein said vinyl monomers are selected from esters of acrylic or methacrylic acid and a $C_1$–$C_8$ monohydric alcohol, $C_8$–$C_9$ monovinyl hydrocarbons, and 0 to 30 mole percent of a difunctional compound selected from the group consisting of divinyl benzene and diesters of acrylic or methacrylic acid and a $C_2$–$C_6$ dihydric alcohol, said vinyl resin has between about 0.7 and about 3.5 units of alpha-beta olefinic unsaturation per 1,000 units molecular weight, and said particle of graded rubber used to form said rubber-urethane-acrylate addition product has average diameter in the range of about 0.04 to about 1 micron.

8. A paint in accordance with claim 1 wherein above 50 mole percent of the constituent monomers of said copolymer are acrylic monomers and said vinyl resin has between about 0.7 and about 3.5 units of alpha-beta olefinic unsaturation units per 1,000 units molecular weight.

9. A paint in accordance with claim 1 wherein above 50 mole percent of the constituent monomers of said copolymer are esters of acrylic or methacrylic acid and a $C_1$–$C_8$ monohydric alcohol and said vinyl resin has between about 0.7 and about 3.5 units of alpha-beta olefinic unsaturation per 1,000 units molecular weight.

10. A paint in accordance with claim 1 wherein said diisocyanate is 2,4-toluene diisocyanate.

11. A radiation-curable paint which on a pigment and mineral filler-free basis comprises a film-forming dispersion of about 20 to about 80 weight percent vinyl monomers and about 80 to about 20 weight percent of a polymeric component consisting essentially of (A) about 5 to about 95 weight percent of an alpha-beta olefinically unsaturated vinyl resin having average molecular weight in the range of 1,000 to about 25,000, containing about 0.7 to about 3.5 units of alpha-beta olefinic unsaturation per 1,000 units molecular weight, and being further characterized in that its longest carbon-to-carbon chain is a copolymer wherein at least above 50 mole percent of the constituent monomers are selected from the group consisting of acrylic monomers and aromatic vinyl hydrocarbon monomers, the alpha-beta olefinic unsaturation thereof is terminal with respect to a lesser carbon-to-carbon chain that is pendant from said longest carbon-to-carbon chain and separated therefrom by a linking group selected from the group consisting of ester groups and ether groups and (B) about 95 to about 5 weight percent of a rubber-urethane-acrylate addition product formed by reacting a first isocyanate group of a diisocyanate with a hydroxy-functional particle of graded rubber and reacting the remaining isocyanate group of said diisocyanate with a hydroxy alkyl acrylate selected from the group consisting of hydroxyethyl acrylate, hydroxyethyl methacrylate, hydroxypropyl acrylate and hydroxypropyl methacrylate, said particle of graded rubber consisting essentially of (1) about 10 to about 90 weight percent of a core of crosslinked acrylic polymer consisting essentially of (a) a minor and crosslinking amount of a di- or tri- functional monomer containing 2 or more non-conjugated terminal ethylenic groups selected from the group consisting of divinyl benzene, a diester of acrylic or methacrylic acid and a $C_2$–$C_8$ dihydric alcohol and a triester of acrylic or methacrylic acid and a $C_2$–$C_8$ trihydric alcohol, said minor and crosslinking amount not exceeding about 20 mole percent of the core reactants, and (b) a remainder consisting essentially of an ester of acrylic acid and a $C_2$–$C_8$ monohydric alcohol, said remainder constituting at a minimum about 80 mole percent of the core reactants, and (2) about 90 to about 10 weight percent of an outer shell having glass transition temperature at least 50° C. above that of said core consisting essentially of the polymerization product of monomers selected from the group consisting of (a) about 70 to about 95 mole percent methyl methacrylate and about 5 to about 30 mole percent of a hydroxy-functional acrylate selected from hydroxyethyl acrylate, hydroxyethyl methacrylate, hydroxypropyl acrylate and hydroxypropyl methacrylate and (b) about 5 to about 30 mole percent of a hydroxy-functional acrylate selected from hydroxyethyl acrylate, hydroxyethyl methacrylate, hydroxypropyl acrylate, and hydroxypropyl methacrylate and about 70 to about 95 mole percent of a mixture consisting essentially of esters of acrylic or methacrylic acid and a $C_1$–$C_8$ alcohol, $C_8$–$C_9$ monovinyl hydrocarbons, 0 to 30 mole percent of a difunctional compound selected from divinyl benzene, and diesters of acrylic or methacrylic acid and $C_2$–$C_6$ dihydric alcohols and 0 to 30 mole percent of a monomer selected from the group consisting of acrylonitrile, methacrylonitrile and vinyl acetate.

12. A paint in accordance with claim 11 wherein said vinyl resin has average molecular weight in the range of 1,000 to about 15,000.

13. A paint in accordance with claim 11 wherein said vinyl resin has average molecular weight in the range of about 5,000 to about 15,000.

14. A paint in accordance with claim 11 wherein said core is crosslinked acrylic polymer consisting essentially of butyl acrylate and 1,3-butylene dimethacrylate.

15. A paint in accordance with claim 11 wherein said core is a crosslinked acrylic polymer consisting essentially of 2-ethyl hexyl acrylate and 1,3-butylene dimethacrylate.

16. A paint in accordance with claim 11 wherein said vinyl monomers are selected from esters of acrylic or methacrylic acid and a $C_1$–$C_8$ monohydric alcohol, $C_8$–$C_9$ monovinyl hydrocarbons, and 0 to 30 mole percent of a difunctional compound selected from divinyl benzene and diesters of acrylic or methacrylic acid and a $C_2$–$C_6$ dihydric alcohol, and the graded rubber particles used to form said rubber-urethane-acrylate addition product have average diameter in the range of about 0.04 to about 1 micron.

17. A paint in accordance with claim 11 wherein above 50 mole percent of the constituent monomers of said copolymer are acrylic monomers.

18. A paint in accordance with claim 11 wherein above 50 mole percent of the constituent monomers of said copolymer are esters of acrylic or methacrylic acid and a $C_1$–$C_8$ monohydric alcohol.

19. A paint in accordance with claim 11 wherein said diisocyanate is 2,4-toluene diisocyanate.

20. The method of coating a substrate which comprises (I) applying to a surface of said substrate a film of radiation-curable paint which on a pigment and mineral filler-free basis comprises a film-forming dispersion of about 20 to about 80 weight percent of vinyl monomers and about 80 to about 20 weight percent of a polymeric component consisting essentially of (A) about 2 to about 98 weight percent of an alpha-beta olefinically unsaturated vinyl resin having average molecular weight in excess of about 1,000, containing about 0.5 to about 5 units of alpha-beta olefinic unsaturation per 1,000 units molecular weight, and being further characterized in that its longest carbon-to-carbon chain is a copolymer wherein about 50 mole percent of the constituent monomers and aromatic vinyl hydrocarbon monomers, the alpha-beta olefinic unsaturation thereof is terminal with respect to a lesser carbon-to-carbon chain that is pendant from said longest carbon-to-carbon chain and separated therefrom by a linking group selected from the group consisting of ester groups and ether groups and (B) about 98 to about 2 weight percent of a rubber-urethane-acrylate addition product formed by reacting a first isocyanate group of a diisocyanate with a hydroxy-functional particle of graded rubber and reacting the remaining isocyanate group of said diisocyanate with a hydroxyalkyl acrylate selected from the group consisting of hydroxyethyl acrylate, hydroxyethyl methacrylate, hydroxypropyl acrylate and hydroxypropyl methacrylate, said particle of graded rubber consisting essentially of (1) about 10 to about 90 weight percent of a core of crosslinked acrylic polymer consisting essentially of (a) a minor and crosslinking amount of a di- or tri-functional monomer containing 2 or more nonconjugated terminal ethylenic groups, said minor and crosslinking amount not exceeding about 20 mole percent of the core reactants, and (b) a remainder consisting essentially of a monofunctional monoacrylate, said remainder constituting at a minimum about 80 mole percent of the core reactants, and (2) about 90 to about 10 weight percent of an outer shell having glass transition temperature above that of said core and consisting essentially of the polymerization product of monomer mixtures selected from the group consisting of (a) about 65 to about 98 mole percent methyl methacrylate and about 2 to about 35 mole percent of a hydroxy-functional acrylate selected from the group consisting of hydroxyethyl acrylate, hydroxyethyl methacrylate, hydroxypropyl acrylate and hydroxypropyl methacrylate, and (b) about 2 to about 35 mole percent of a hydroxy-functional acrylate selected from the group consisting essentially of hydroxyethyl acrylate, hydroxyethyl methacrylate, hydroxypropyl acrylate and hydroxypropyl methacrylate and about 65 to about 98 mole percent of a mixture consisting essentially of esters of acrylic or methacrylic acid and a $C_1$–$C_8$ monohydric alcohol, $C_8$–$C_9$ monovinyl hydrocarbons, 0 to 30 mole percent of a difunctional compound selected from divinyl benzene and diesters of acrylic or methacrylic acid and a $C_2$–$C_6$ dihydric alcohol and 0 to 30 mole percent of a monomer selected from acrylonitrile, methacrylonitrile, and vinyl acetate, and (II) crosslinking said film upon said substrate by exposing said film to a beam of electrons having average energy in the range of about 100,000 to 500,000 electron volts.

21. The method of claim 20 wherein said alpha-beta olefinically unsaturated vinyl resin has between about 0.7 and about 3.5 units of alpha-beta olefinic unsaturation per 1,000 units molecular weight.

22. The method of claim 20 wherein said alpha-beta olefinically unsaturated vinyl resin has average molecular weight between 1,000 and about 25,000 and between about 0.7 and about 3.5 units of alpha-beta olefinic unsaturation per 1,000 units molecular weight.

23. The method of claim 20 wherein said alpha-beta olefinically unsaturated vinyl resin has average molecular weight between about 5,000 and about 15,000 and between about 0.7 and about 3.5 units of alpha-beta olefinic unsaturation per 1,000 units molecular weight.

24. The method of claim 20 wherein said vinyl monomers are selected from esters of acrylic or methacrylic acid and a $C_1$–$C_8$ monohydric alcohol, $C_1$–$C_8$ monovinyl hydrocarbons, and 0 to 30 mole percent of a difunctional compound selected from the group consisting of divinyl benzene and diesters of acrylic or methacrylic acid and a $C_2$–$C_6$ dihydric alcohol, said vinyl resin has between about 0.7 to about 3.5 units of alpha-beta olefinic unsaturation per 1,000 units molecular weight, and said particles of graded rubber used to form said rubber-urethane-acrylate addition product has average diameter in the range of about 0.04 to about 1 micron.

25. The method of claim 20 wherein said diisocyanate is 2,4-toluene diisocyanate.

26. The method of coating a substrate which comprises (I) applying to a surface of said substrate a film of radiation-curable paint which on a pigment and mineral filler-free basis comprises a film-forming dispersion of about 20 to about 80 weight percent of vinyl monomers and about 80 to about 20 weight percent of a polymeric component consisting essentially of (A) about 5 to about 95 weight percent of an alpha-beta olefinically unsaturated vinyl resin having average molecular weight in the range of 1,000 to about 25,000, containing about 0.7 to about 3.5 units of alpha-beta olefinic unsaturation per 1,000 units molecular weight, and being further characterized in that its longest carbon-to-carbon chain is a copolymer wherein at least a major proportion of the constituent monomers are selected from the group consisting of acrylic monomers and aromatic vinyl hydrocarbon monomers, the alpha-beta olefinic unsaturation thereof is terminal with respect to a lesser carbon-to-carbon chain that is pendant from said longest carbon-to-carbon chain and separated therefrom by a linking group selected from the group consisting of ester groups and ether groups and (B) about 95 to about 5 weight percent of a rubber-urethane-acrylate addition product formed by reacting a first isocyanate group of a diisocyanate with a hydroxy-functional particle of graded rubber and reacting the remaining isocyanate group of said diisocyanate with a hydroxyalkyl acrylate selected from the group consisting of hydroxyethyl acrylate, hydroxyethyl methacrylate, hydroxypropyl acrylate and hydroxypropyl methacrylate, said particle of graded rubber consisting essentially of
(1) about 10 to about 90 weight percent of a core of crosslinked acrylic polymer consisting essentially of
(a) a minor and crosslinking amount of a di- or tri-functional monomer containing 2 or more non-conjugated terminal ethylenic groups selected from the group consisting of divinyl benzene, a diester of acrylic or methacrylic acid and a $C_2$–$C_8$ dihydric alcohol and a triester of acrylic or methacrylic acid and a $C_2$–$C_8$ trihydric alcohol, said minor and crosslinking amount not exceeding about 20 mole percent of the core reactants, and
(b) a remainder consisting essentially of an ester of acrylic acid and a $C_2$–$C_8$ monohydric alcohol, said remainder constituting at a minimum about 80 mole percent of the core reactants, and
(2) about 90 to about 10 weight percent of an outer shell having glass transition temperature at least 50° C. above that of said core and consisting essentially of the polymerization product of monomers selected from the group consisting of
(a) about 70 to about 95 mole percent methyl methacrylate and about 5 to about 30 mole percent of a hydroxy-functional acrylate selected from the group consisting of hydroxyethyl acrylate, hydroxyethyl methacrylate, hydroxypropyl acrylate, and hydroxypropyl methacrylate and about 70 to about 95 mole percent of a mixture consisting essentially of esters of acrylic or methacrylic acid and a $C_1$–$C_8$ alcohol, $C_8$–$C_9$ monovinyl hydrocarbons, 0 to 30 mole percent of a difunctional compound selected from the group consisting of divinyl benzene, and diesters of acrylic or methacrylic acid and $C_2$–$C_6$ dihydric alcohols and 0 to 30 mole percent of a monomer selected from the group consisting of acrylonitrile, methacrylonitrile and vinyl acetate, and
(II) crosslinking said film upon said substrate by exposing said film to a beam of electrons having average energy in the range of about 100,000 to 500,000 electron volts.

27. The method of claim 26 wherein said vinyl resin has average molecular weight in the range of 1,000 to about 15,000.

28. The method of claim 26 wherein said vinyl resin has average molecular weight in the range of about 5,000 to about 15,000.

29. The method of claim 26 wherein said vinyl monomers are selected from esters of acrylic or methacrylic acid and a $C_1$–$C_8$ monohydric alcohol, $C_8$–$C_9$ monovinyl hydrocarbons, and 0 to 30 mole percent of a difunctional compound selected from divinyl benzene and diesters of acrylic or methacrylic acid and a $C_2$–$C_6$ dihydric alcohol, and the graded rubber particles used to form said rubber-urethane-acrylate addition product have average diameter in the range of about 0.04 to about 1 micron.

30. An article of manufacture comprising in combination a substrate and a coating thereon comprising the polymerization product of a film-forming dispersion crosslinked in situ by ionizing radiation, said film-forming dispersion on a pigment and particulate filler-free basis consisting essentially of about 20 to about 80 weight percent vinyl monomers and about 80 to about 20 weight percent of a polymeric component consisting essentially of (A) about 2 to about 98 weight percent of an alpha-beta olefinically unsaturated vinyl resin having average molecular weight in excess of 1,000 containing about 0.5 to about 5 units of alpha-beta olefinic unsaturation per 1,000 units molecular weight, and being further characterized in that its longest carbon-to-carbon chain is a copolymer wherein above 50 mole percent of the constituent monomers are selected from the group consisting of acrylic monomers and aromatic vinyl hydrocarbon monomers, the alpha-beta olefinic unsaturation thereof is terminal with respect to a lesser carbon-to-carbon chain that is pendant from said longest carbon-to-carbon chain and separated therefrom by a linking group selected from the group consisting of ester groups and ether groups and (B) about 98 to about 2 weight percent of a rubber-urethane-acrylate addition product formed by reacting a first isocyanate group of a diisocyanate with a hydroxy-functional particle of graded rubber and reacting the remaining isocyanate group of said diisocyanate with hydroxyalkyl acrylate, said particle of graded rubber consisting essentially of
(1) about 10 to about 90 weight percent of a core of crosslinked acrylic polymer consisting essentially of
(a) a minor and crosslinking amount of a di- or tri-functional monomer containing 2 or more nonconjugated terminal ethylenic groups, said minor and crosslinking amount not exceeding about 20 mole percent of the core reactants, and
(b) a remainder consisting essentially of a monofunctional monoacrylate, said remainder constituting at a minimum about 80 mole percent of the core reactants, and
(2) about 90 to about 10 weight percent of an outer shell having glass transition temperature above that of said core and consisting essentially of the polymerization product of monomer mixtures selected from the group consisting of
(a) about 65 to about 98 mole percent methyl methacrylate and about 2 to 35 mole percent of a hydroxy-functional acrylate selected from the group consisting of hydroxyethyl acrylate, hydroxyethyl methacrylate, hydroxypropyl acrylate and hydroxypropyl methacrylate, and (b) about to to about 35 mole percent of a hydroxy-functional acrylate selected from the group consisting of hydroxyethyl acrylate, hydroxyethyl methacrylate, hydroxypropyl acrylate and hydroxypropyl methacrylate and about 65 to about 98 mole percent of a mixture consisting essentially of esters of acrylic or methacrylic acid and a $C_1$–$C_8$ monohydric alcohol, $C_8$–$C_9$ monovinyl hydrocarbons, 0 to 30 mole percent of a difunctional compound selected from divinyl benzene and diesters of acrylic or methacrylic acid and $C_2$–$C_6$ dihydric alcohol and 0 to 30 mole percent of a monomer selected from acrylonitrile, methacrylonitrile and vinyl acetate.

31. An article of manufacture comprising in combination a substrate and a coating thereon comprising the polymerization product of a film-forming dispersion crosslinked in situ by ionizing radiation, said film-forming dispersion on a pigment and particulate filler-free basis consisting essentially of about 20 to about 80 weight percent vinyl monomers consisting essentially of about 70 to about 100 mole percent of vinyl monomers selected from the group consisting of esters of acrylic or methacrylic acid and a $C_1$–$C_8$ monohydric alcohol, $C_8$–$C_9$ monovinyl hydrocarbons, and 0 to about 30 mole percent of a difunctional compound selected from divinyl benzene and diesters of acrylic or methacrylic acid and about 80 to about 20 weight percent of a polymeric component consisting essentially of (A) about 5 to about 95 weight percent of an alpha-beta olefinically unsaturated vinyl resin having average molecular weight in the range of 1,000 to about 25,000 containing about 0.7 to about 0.3 units of alpha-beta olefinic unsaturation per 1,000 units molecular weight, and being further characterized in that its longest carbon-to-carbon chain is a copolymer wherein at least above 50 mole percent of the constituent monomers are selected from the group consisting of acrylic monomers and aromatic vinyl hydrocarbon monomers, the alpha-beta olefinic unsaturation thereof is terminal with respect to a lesser carbon-to-carbon chain that is pendant from said longest carbon-to-carbon chain and separated therefrom by a linking group selected from the group consisting of ester groups and ether groups and (B) about 95 to about 5 weight percent of a rubber-urethane-acrylate addition product formed by reacting a first isocyanate group of a diisocyanate with a hydroxy-functional particle of graded rubber and reacting the remaining isocyanate group of said diisocyanate with a hydroxy alkyl acrylate selected from the group consisting of hydroxyethyl acrylate, hydroxyethyl methacrylate, hydroxypropyl acrylate and hydroxypropyl methacrylate, said particle of graded rubber consisting essentially of (1) about 10 to about 90 weight percent of a core of crosslinked acrylic polymer consisting essentially of (a) a minor and crosslinking amount of a di- or tri-functional monomer containing 2 or more non-conjugated terminal ethylenic groups selected from the group consisting of divinyl benzene, a diester of acrylic or methacrylic acid and a $C_2$–$C_8$ dihydric alcohol and a triester of acrylic or methacrylic acid and a $C_2$–$C_8$ trihydric alcohol, said minor and crosslinking amount not exceeding about 20 mole percent of the core reactants, and (b) a remainder consisting essentially of an ester of acrylic acid and a $C_2$–$C_8$ monohydric alcohol, said remainder constituting at a minimum about 80 mole percent of the core reactants, and (2) about 90 to about 10 weight percent of an outer shell having glass transition temperature at least 50° C. above that of said core consisting essentially of the polymerization product of monomers selected from the group consisting of (a) about 70 to about 95 mole percent methyl methacrylate and about 5 to about 30 mole percent of a hydroxy-functional acrylate selected from hydroxyethyl acrylate, hydroxyethyl methacrylate, hydroxypropyl acrylate and hydroxypropyl methacrylate, and (b) about 5 to about 30 mole percent of a hydroxy-functional acrylate selected from hydroxyethyl acrylate, hydroxyethyl methacrylate, hydroxypropyl acrylate, and hydroxypropyl methacrylate and about 70 to about 95 mole percent of a mixture consisting essentially of esters of acrylic or methacrylic acid and $C_1$–$C_8$ alcohol, $C_8$–$C_9$ monovinyl hydrocarbons, 0 to 30 mole percent of a difunctional compound selected from divinyl benzene, and diesters of acrylic or methacrylic acid and $C_2$–$C_6$ dihydric alcohols and 0 to 30 mole percent of a monomer selected from the group consisting of acrylonitrile, methacrylonitrile and vinyl acetate.

32. A radiation-curable paint which on a pigment and mineral filler-free basis comprises a film-forming dispersion of about 20 to 80 weight percent vinyl monomers and about 80 to about 20 weight percent of a polymeric component consisting essentially of (A) about 2 to about 98 weight percent of an alpha-beta olefinically unsaturated vinyl resin having average molecular weight in the range of 1,000 to about 25,000 containing between about 0.5 and 5 units of alpha-beta olefinic unsaturation per 1,000 units molecular weight, and being further characterized in that its longest carbon-to-carbon chain is a copolymer wherein at least 50 mole percent of the constituent monomers are selected from the group consisting of acrylic monomers and aromatic hydrocarbon monomers, the alpha-beta olefinic unsaturation thereof is terminal with respect to a lesser carbon-to-carbon chain that is pendant from said longest carbon-to-carbon chain and separated therefrom by a linking group selected from the group consisting of ester groups and ether groups and (B) about 98 to about 2 weight percent of a rubber-urethane-acrylate addition product formed by reacting a first isocyanate group of a diisocyanate with a hydroxy-functional particle of graded rubber and reacting the remaining isocyanate group of said diisocyanate with a hydroxy alkyl acrylate selected from the group consisting of hydroxypropyl acrylate and hydroxypropyl methacrylate, said particle of graded rubber consisting essentially of (1) about 10 to about 90 weight percent of a core of crosslinked acrylic polymer consisting essentially of (a) a minor and crosslinking amount of a di- or tri-functional monomer containing 2 or more nonconjugated terminal ethylenic groups selected from the group consisting of divinyl benzene, a diester of acrylic or methacrylic acid and a $C_2$–$C_8$ dihydric alcohol and a triester of acrylic or methacrylic acid and a $C_2$–$C_8$ trihydric alcohol, said minor and crosslinking amount not exceeding about 20 mole percent of the core reactants, and (b) a remainder consisting essentially of an ester of acrylic acid and a $C_2$–$C_8$ monohydric alcohol, said remainder constituting at a minimum about 80 mole percent of the core reactants, and (2) about 90 to about 10 weight percent of an outer shell having glass transition temperature at least 50° C. above that of said core consisting essentially of the polymerization product of monomers selected from the group consisting of (a) about 70 to about 95 mole percent methyl methacrylate and about 5 to about 30 mole percent of a hydroxy-functional acrylate selected from hydroxyethyl acrylate, hydroxyethyl methacrylate, hydroxypropyl acrylate and hydroxypropyl methacrylate and
  (b) about 5 to about 30 mole percent of a hydroxy-functional acrylate selected from hydroxyethyl acrylate, hydroxyethyl methacrylate, hydroxypropyl acrylate, and hydroxypropyl methacrylate and about 70 to about 95 mole percent of a mixture consisting essentially of esters of acrylic or methacrylic acid and a $C_1$–$C_8$ alcohol, $C_8$–$C_9$ monovinyl hydrocarbons, 0 to 30 mole percent of a difunctional compound selected from divinyl benzene, and diesters of acrylic or methacrylic acid and $C_2$–$C_6$ dihydric alcohols and 0 to 30 mole percent of a monomer selected from the group consisting of acrylonitrile, methacrylonitrile and vinyl acetate.

33. The method of coating a substrate which comprises (I) applying to a surface of said substrate a film of radiation-curable paint which on a pigment and mineral filler-free basis comprises a film-forming dispersion of about 20 to about 80 weight percent of a polymeric component consisting essentially of (A) about 2 to about 98 weight percent of an alpha-beta olefinically unsaturated vinyl resin having average molecular weight in the range of 1,000 to about 25,000 containing between 0.5 and 5 units of alpha-beta olefinic unsaturation per 1,000 units molecular weight, and being further characterized in that its longest carbon-to-carbon chain is a copolymer wherein at least 50 mole percent of the constituent monomers are selected from the group consisting of acrylic monomers and aromatic vinyl hydrocarbon monomers, the alpha-beta olefinic unsaturation thereof is terminal with respect to a lesser carbon-to-carbon chain that is pendant from said longest carbon-to-carbon chain and separated therefrom by a linking group selected from the group consisting of ester groups and ether groups and (B) about 98 to about 2 weight percent of a rubber-urethane-acrylate addition product formed by reacting a first isocyanate group of a diisocyanate with a hydroxy-functional particle of graded rubber and reacting the remaining isocyanate group of said diisocyanate with a hydroxyalkyl acrylate selected from the group consisting of hydroxyethyl acrylate, hydroxyethyl methacrylate, hydroxypropyl acrylate and hydroxypropyl methacrylate, said particle of graded rubber consisting essentially of
  (1) about 10 to about 90 weight percent of a core of crosslinked acrylic polymer consisting essentially of
    (a) a minor and crosslinking amount of a di- or tri-functional monomer containing 2 or more nonconjugated terminal ethylenic groups selected from the group consisting of divinyl benzene, a diester of acrylic or methacrylic acid and a $C_2$–$C_8$ dihydric alcohol and a triester of acrylic or methacrylic acid and a $C_2$–$C_8$ trihydric alcohol, said minor and crosslinking amount not exceeding about 20 mole percent of the core reactants, and
    (b) a remainder consisting essentially of an ester of acrylic acid and a $C_2$–$C_8$ monohydric alcohol, said remainder constituting at a minimum about 80 mole percent of the core reactants, and
  (2) about 90 to about 10 weight percent of an outer shell having glass transition temperature at least 50° C. above that of said core and consisting essentially of the polymerization product of monomers selected from the group consisting of
    (a) about 70 to about 95 mole percent methyl methacrylate and about 5 to about 30 mole percent of a hydroxy-functional acrylate selected from the group consisting of hydroxyethyl acrylate, hydroxyethyl methacrylate, hydroxypropyl acrylate, and hydroxypropyl methacrylate and about 70 to about 95 mole percent of a mixture consisting essentially of esters of acrylic or methacrylic acid and a $C_1$–$C_8$ alcohol, $C_8$–$C_9$ monovinyl hydrocarbons, 0 to 30 mole percent of a difunctional compound selected from the group consisting of divinyl benzene, and diesters of acrylic or methacrylic acid and $C_2$–$C_6$ dihydric alcohols and 0 to 30 mole percent of a monomer selected from the group consisting of acrylonitrile, methacrylonitrile and vinyl acetate, and (II) crosslinking said film upon said substrate by exposing said film to a beam of electrons having average energy in the range of about 100,000 to 500,000 electron volts.

34. An article of manufacture comprising in combination a substrate and a coating thereon comprising the polymerization product of a film-forming dispersion crosslinked in situ by ionizing radiation, said film-forming dispersion on a pigment and particulate filler-free basis consisting essentially of about 20 to about 80 weight percent vinyl monomers consisting essentially of about 70 to about 100 mole percent of vinyl monomers selected from the group consisting of esters of acrylic or methacrylic acid and a $C_1$–$C_8$ monohydric alcohol, $C_8$–$C_9$ monovinyl hydrocarbons, and 0 to about 30 mole percent of a difunctional compound selected from divinyl benzene and diesters of acrylic or methacrylic acid and about 80 to about 20 weight percent of a polymeric component consisting essentially of (A) about 2 to about 98 weight percent of an alpha-beta olefinically unsaturated vinyl resin having average molecular weight in the range of 1,000 to about 25,000, containing between about 0.5 and about 5 units of alpha-beta olefinic unsaturation per 1,000 units molecular weight, and being further characterized in that its longest carbon-to-carbon chain is a copolymer wherein at least above 50 mole percent of the constituent monomers and aromatic vinyl hydrocarbon monomers, the alpha-beta olefinic unsaturation thereof is terminal with respect to a lesser carbon-to-carbon chain that is pendant from said longest carbon-to-carbon chain and separated therefrom by a linking group selected from the group consisting of ester groups and ether groups and (B) about 98 to about 2 weight percent of a rubber-urethane-acrylate addition product formed by reacting a first isocyanate group of a diisocyanate with a hydroxy-functional particle of graded rubber and reacting the remaining isocyanate group of said diisocyanate with a hydroxy alkyl acrylate selected from the group consisting of hydroxyethyl acrylate, hydroxyethyl methacrylate, hydroxypropyl acrylate and hydroxypropyl methacrylate, said particle of graded rubber consisting essentially of
  (1) about 10 to about 90 weight percent of a core of crosslinked acrylic polymer consisting essentially of
    (a) a minor and crosslinking amount of a di- or tri-functional monomer containing 2 or more nonconjugated terminal ethylenic groups selected from the group consisting of divinyl benzene, a diester of acrylic or methacrylic acid and a $C_2$–$C_8$ dihydric alcohol and a triester of acrylic or methacrylic acid and a $C_2$–$C_8$ trihydric alcohol, said minor and crosslinking amount not exceeding about 20 mole percent of the core reactants, and
    (b) a remainder consisting essentially of an ester of acrylic acid and a $C_2$–$C_8$ monohydric alcohol, said remainder constituting at a minimum about 80 mole percent of the core reactants, and
  (2) about 90 to about 10 weight percent of an outer shell having glass transition temperature at least 50° C. above that of said core consisting essentially of the polymerization product of monomers selected from the group consisting of
    (a) about 70 to about 95 mole percent methyl methacrylate and about 5 to about 30 mole percent of a hydroxy-functional acrylate selected from hydroxyethyl acrylate, hydroxyethyl methacrylate, hydroxypropyl acrylate and hydroxypropyl methacrylate and (b) about 5 to about 30 mole percent of a hydroxy-functional acrylate selected from hydroxyethyl acrylate, hydroxyethyl methacrylate, hydroxypropyl acrylate, and hydroxypropyl methacrylate and about 70 to about 95 mole percent of a mixture consisting essentially of esters of acrylic or methacrylic acid and a $C_1$–$C_8$ alcohol, $C_8$–$C_9$ monovinyl hydrocarbons, 0 to 30 mole percent of a difunctional compound selected from divinyl benzene, and diesters of acrylic or methacrylic acid and $C_2$–$C_6$ dihydric alcohols and 0 to 30 mole percent of a monomer selected from the group consisting of acrylonitrile, methacrylonitrile and vinyl acetate.

References Cited
UNITED STATES PATENTS

| | | | |
|---|---|---|---|
| 3,423,481 | 1/1969 | Mizutani | 260—836 |
| 3,437,514 | 4/1969 | Burlant | 117—93.31 |
| 3,450,796 | 6/1969 | Griffin | 260—885 |
| 3,502,745 | 3/1970 | Minton | 260—881 |
| 3,509,234 | 4/1970 | Burlant | 117—93.31 |
| 3,528,844 | 9/1970 | Burlant | 117—93.31 |

PAUL LIEBERMAN, Primary Examiner

U.S. Cl. X.R.

260—77.5 CR, 77.5 TB, 836, 859, 885